April 26, 1960 E. S. PETERSON 2,934,609

VARIABLE MESSAGE LENGTH AUTOMATIC RECORDER ANNOUNCER

Filed Oct. 4, 1954 5 Sheets-Sheet 1

INVENTOR.
EDWARD S. PETERSON
BY Wm Walter Owen
ATTY.

April 26, 1960 E. S. PETERSON 2,934,609

VARIABLE MESSAGE LENGTH AUTOMATIC RECORDER ANNOUNCER

Filed Oct. 4, 1954 5 Sheets-Sheet 2

INVENTOR.
EDWARD S. PETERSON

BY Mc Walter Owen

ATTY.

April 26, 1960 E. S. PETERSON 2,934,609

VARIABLE MESSAGE LENGTH AUTOMATIC RECORDER ANNOUNCER

Filed Oct. 4, 1954 5 Sheets-Sheet 3

INVENTOR.
EDWARD S. PETERSON

BY [signature]

ATTY.

VARIABLE MESSAGE LENGTH AUTOMATIC RECORDER ANNOUNCER

Filed Oct. 4, 1954 5 Sheets-Sheet 4

INVENTOR.
EDWARD S. PETERSON
BY Wm. Watts Owen
ATTY.

VARIABLE MESSAGE LENGTH AUTOMATIC RECORDER ANNOUNCER

Filed Oct. 4, 1954 5 Sheets-Sheet 5

INVENTOR.
EDWARD S. PETERSON
BY Mc Walter Duval
ATTY.

United States Patent Office 2,934,609
Patented Apr. 26, 1960

2,934,609

VARIABLE MESSAGE LENGTH AUTOMATIC RECORDER ANNOUNCER

Edward S. Peterson, Elmwood Park, Ill., assignor to General Telephone Laboratories, Incorporated, a corporation of Delaware

Application October 4, 1954, Serial No. 460,028

11 Claims. (Cl. 179—100.1)

This invention relates in general to sound recording and reproducing systems, and is particularly directed to the use of magnetic drum recorders for making announcements of various types over telephone lines, in response to subscriber calls to the number assigned to this service.

It is an object of the invention to provide, in a recorder-announcer of this type, means for recording and reproducing announcements of considerable length, without requiring the use of a large and cumbersome drum.

It is another object of the invention to provide, in a system of this character, means for at different times recording and reproducing announcements of various lengths, and for varying the reproducing cycle automatically to fit the length of the announcement.

Other objects and features of the invention will be made apparent by the following specification and the appended drawings, comprising Figures 1 to 7 inclusive.

Figures 1, 2:
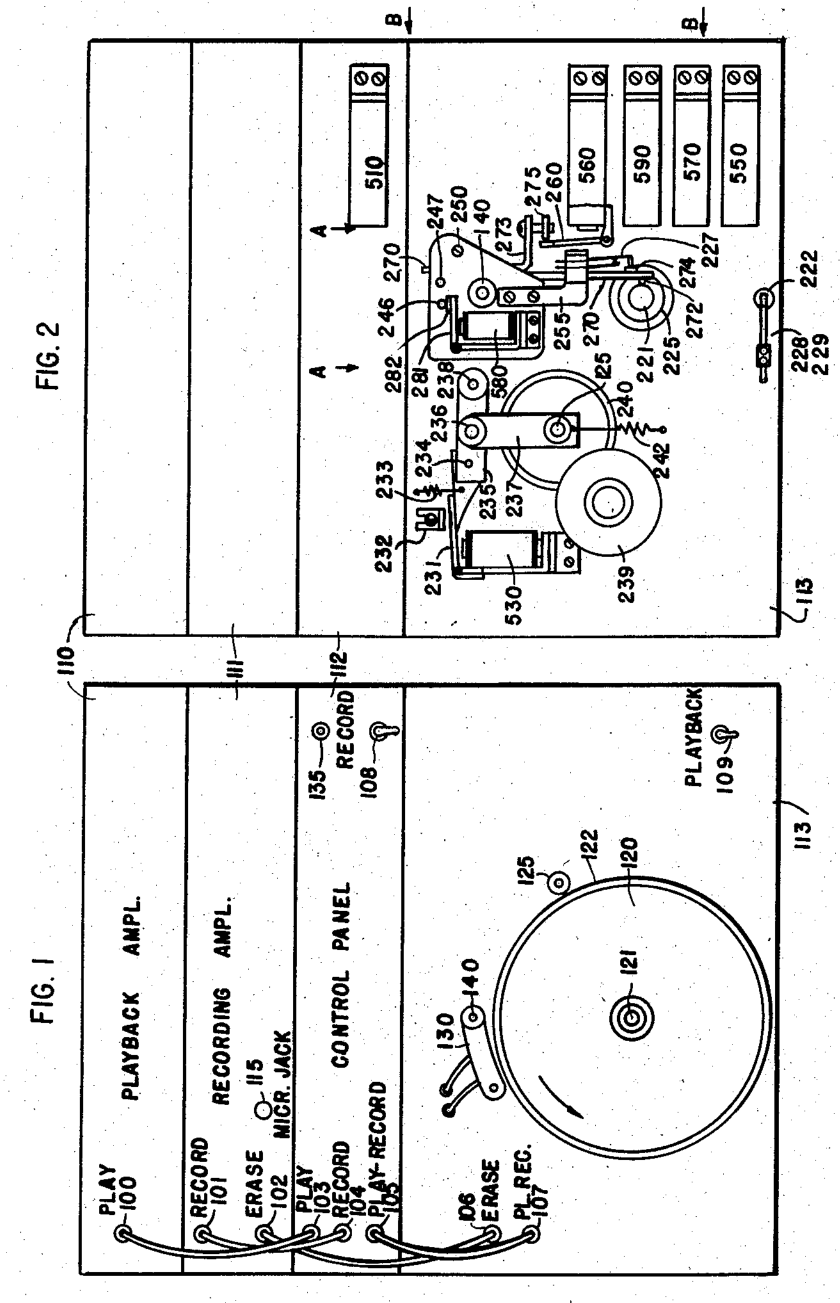
Fig. 1 is a front view of the recorder-announcer of the invention, with certain items of equipment such as vacuum tubes and the like omitted, in the interests of simplicity.
Fig. 2 is a rear view of the announcer unit of Fig. 1, with the equipment assumed to be at normal.
Figure 6:
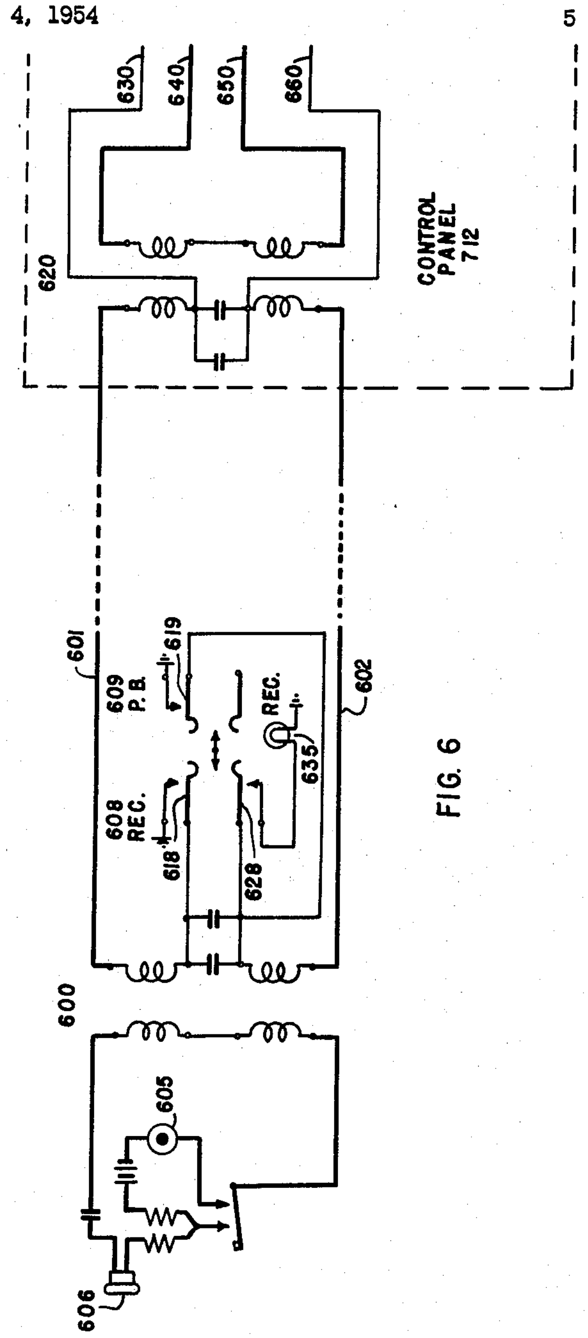
Figs. 6 and 7 represent a schematic circuit diagram of a modified form of the invention providing remote control over two wires, in addition to local control.
Figure 7:
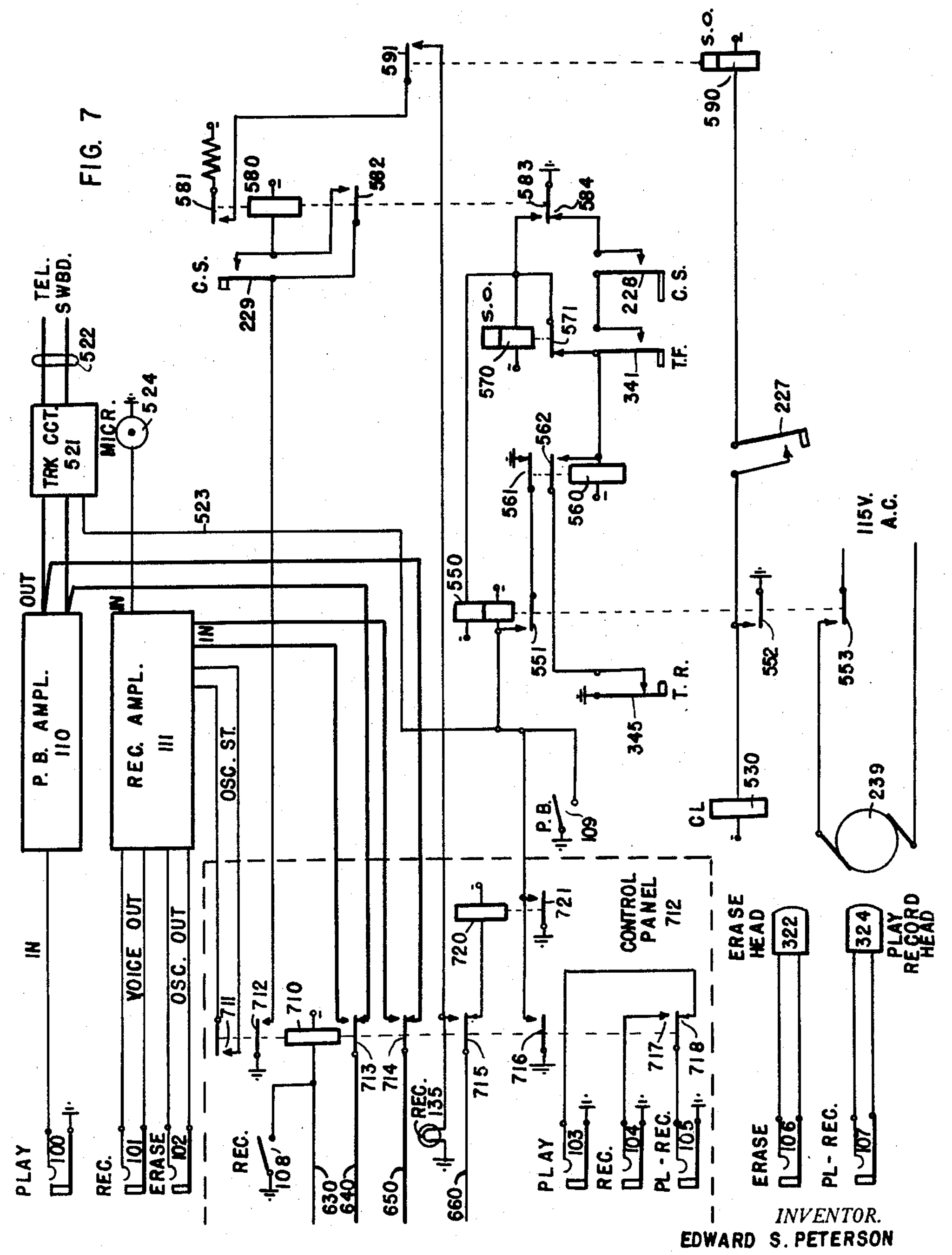

The recorder-announcer unit, as shown in Figs. 1 and 2, consists of four panels of equipment, mounted one above the other, on an angle-iron upright, not shown. The upper panel 110 represents the playback amplifier, the second panel 111 the recording amplifier, and the third panel 112 the control panel, while the lower panel 113 mounts the recorder equipment proper. The four panels are interconnected in the front by patch cords, seen at the left in Fig. 1, and in the rear, by a few wires, not shown. The equipment of the amplifier panels has also been omitted, as incidental to the invention. The control panel 112 of Figs. 1 and 2 consists merely of a record key 108, a record lamp 135, and a record relay 510, in addition to the three patching jacks shown in Fig. 1. This panel is the local control panel used with the circuit of Fig. 5, as shown schematically at the left in Fig. 5. When the remote control scheme of Figs. 6 and 7 is employed, a different control panel 712 is used, as indicated at the right in Fig. 6 and at the left in Fig. 7. This panel includes a repeating coil 620 and two relays

710 and 720, in addition to the record key and lamp and the three patching jacks of the local panel.

The recorder proper, as shown in Figs. 1 and 2, consists essentially of a magnetic drum 120, a head assembly 130, and a drive shaft 125 on the front of the bottom panel 113, and a motor 239 and a lead screw 221 on the back of the panel for controlling the drum and the head assembly. This control is exercised through the intermediary of various mechanical and electrical instrumentalities, including a clutch magnet 530, a length marking magnet 580, a trip magnet 560, a start relay 550, a cut off relay 570, and a lamp control relay 590.

Figure 4:
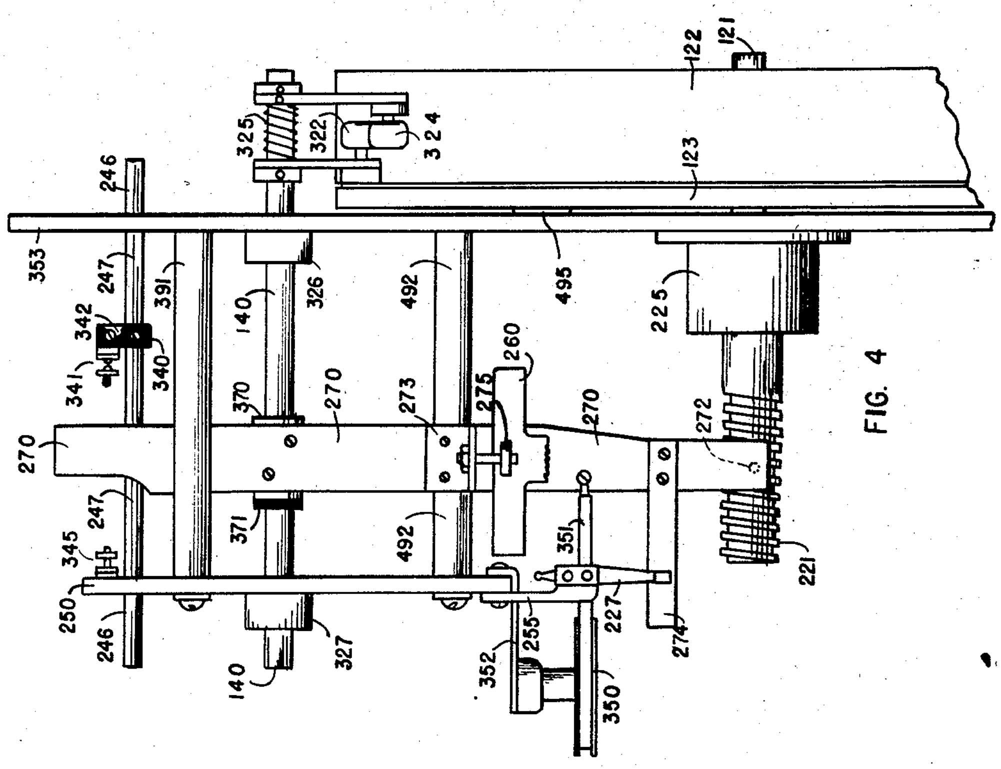
Fig. 4 is an enlarged right hand view of a portion of the equipment panel 113 of Fig. 2 between the arrows B—B, with certain elements omitted, and the equipment shown off normal.
Figure 3:
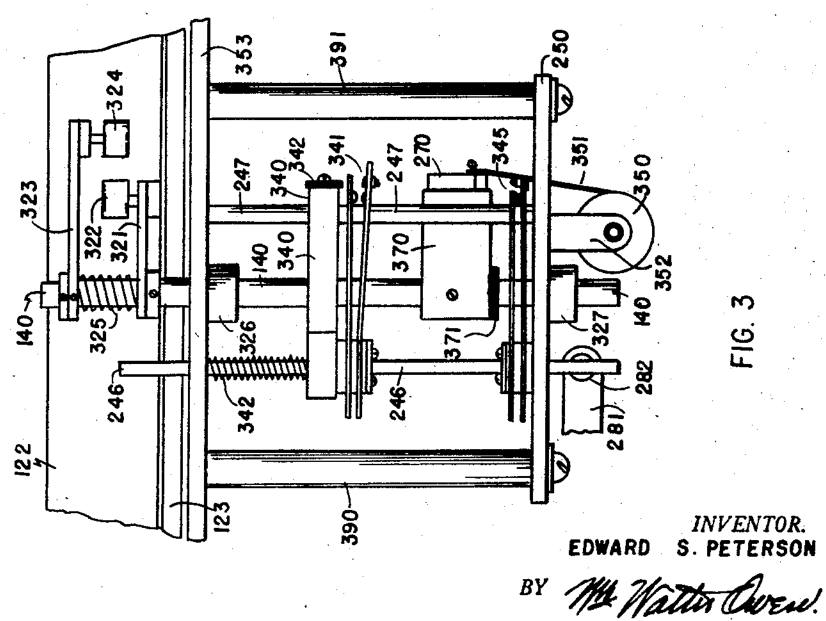
Fig. 3 is an enlarged top view of a portion of the equipment panel 113 of Fig. 2 between the arrows A—A, with certain elements omitted, and the equipment shown off normal.

The magnetic drum 120 consists of a central casting about 8½ inches in diameter and 2 inches wide at the periphery, upon which are mounted a magnetic recording belt 122, and a frictional drive belt 123, best seen in Figs. 3 and 4. The recording belt, which is flush with the front edge of the drum face, is a continuous loop of synthetic rubber about 1⅝ inches wide, with a coating of iron oxide and wax on its outer surface. The drive belt, which is flush with the rear edge of the drum face, is a continuous loop of high friction rubber a little less than ⅜ of an inch in width, against which the forward end of the drive shaft 125 turns to drive the drum, when the machine is in operation. The drum itself is mounted on a shaft 121 arranged to rotate in a bearing 225 mounted on the back of the equipment panel 353, as shown in Fig. 4. The shaft 121 terminates at the rear in a lead screw 221.

The drum driving equipment is also mounted on the back of the unit. As shown in Fig. 2, it consists of a motor 239 arranged to drive a rubber shod wheel 240, under control of the clutch magnet 530. With the clutch magnet in its normally de-energized condition, its armature 231 is pulled up against an adjustable back stop 232 by a spring 233. A pin 234 in a horizontal arm 235 pivoted at 238 is arranged to move in a vertical slot, not visible in the drawings, in the formed vertical right hand end of the armature 231, and to hold the arm 235 normally in its uppermost position. Loosely secured to a mid-point of the arm 235 by a pin 236 is a vertical yoke 237, through the lower end of which passes a rearward extension of the drive shaft 125, so as to be freely rotatable therein. The drive wheel 240 is rigidly secured to the shaft 125.

With the clutch magnet at normal as shown, the wheel 240 and the front end of the drive shaft 125 are held clear of the motor shaft and the driving belt of the drum respectively, against the tension of the pull down spring 242. This prevents the formation of pressure bumps in the rubber of the drive wheel and drive belt, while the machine is standing idle. When the clutch magnet pulls armature 231 downward however, the upward pressure on pin 234 is relieved, and the spring 242 pulls the yoke 237 downward. The yoke 237 causes the arm 235 to rock anti-clockwise on its pivot, and also lowers the drive wheeel 240 and the drive shaft 125 into driving engagement with the motor shaft and the drive belt of the drum respectively. To insure proper engagement, the armature 231 is adjusted to continue moving for a short distance after the members 235 and 237 have stopped moving.

The recording and playing head 324 and the erasing head 322 of the head assembly 130, best seen in Figs. 3 and 4, are mounted on a shaft 140 by means of yokes 323 and 321. The play-record head is rigidly secured to the shaft, which in the normal position of the machine holds the head out of engagement with the magnetic belt, in a manner to be explained subsequently. The erase head 322 is loosely connected to the shaft 140 and rests on the magnetic belt 122 at all times, by the force of gravity. A coiled spring 325 mounted over the shaft between the yokes 323 and 321 acts as a damper which tends to prevent possible bouncing of the erase head, by exerting a light end pressure against the yokes.

The head shaft 140 is slidably and rotatably mounted in the bearings 326 and 327, which are mounted in turn in the front plate 353 and the back plate 250 respectively, the latter being held in parallel spaced relationship with plate 353 by spacer posts such as 390, 391, and 492. Movement of the shaft 140 is controlled by a vertical control bar 270, which is rigidly secured to the shaft by a yoke 370, so that any rocking movement of the bar will rock the shaft 140 and the play-record head 324, and any forward or backward movement of the bar will cause the shaft 140 to move axially and to move the play-record and erase heads correspondingly, across the face of the drum.

In the fully normal position of the machine, as at the start of a new recording, the control bar 270 is held retracted against the back plate 250 by a typewriter carriage-return spring 350 mounted on the back plate by a bracket 352. The bar 270 is held out of actual contact with the plate 250 by a buffer 371 on the rearward side of the yoke 370, but it does come back far enough to cause the upper end of the bar to open a pair of "trip-rear" limit contacts 345. The head controlling shaft 140 is also held fully retracted by the bar 270, so that the recording and erasing heads 324 and 322 are at the inner or rear edge of the magnetic belt 122. In this position also, a pin 272 on the lower inward face of the bar 270 rests on the high point of the second last thread of the lead screw 221. This tilts the bar 270 in an anti-clockwise direction as seen from the rear, which rocks the shaft 140 in the same direction, and lifts the recording head 324 out of engagement with the belt 122. It also causes a horizontal arm 274, projecting rearward from the lower end of bar 270, to hold a pair of recording start contacts 227 in their open position.

Finally a hump or cam 495 on the back of the drum near its periphery (Fig. 4) will have moved to its lowermost position, and a message timing bar 340, suspended horizontally between the plates 353 and 250 near their upper edge on a pair of slide rods 246 and 247, is pressed back against the control bar 270 by a coiled spring 342 on the shaft 246. The timing bar 340 is rigidly secured to the carrier rod 246 which extends through and beyond the plates 353 and 250, and is slidably mounted therein. The bar 340 is also slidably mounted on the guide rod 247 which is rigidly secured to the plates 353 and 250. In the rearmost position of the bar 340, a pair of "trip-front" limit contacts 341 mounted on its upper rear face are pressed together between the rear edge of the control bar 270 and a projecting insulator 342 mounted on the end of the bar 340. The cam 495 of the magnetic drum in its lowermost position causes a pin not shown, which projects through a hole 222 in the bottom of the front plate (Fig. 2), to close two pairs of cam contacts 228 and 229 located on the back of the front plate behind the hole 222.

If now, the drum 120 is caused to rotate in a clockwise direction as seen from the rear, the pin 272 on the lower end of the control bar 270 will drop into the groove of the thread of the lead screw 221, which will thereupon start driving the pin and the bar 270 slowly forward, or to the right as seen in Fig. 4. The pin 272, which may be a horizontal pin as illustrated or a vertical pin mounted in the jaws of a U-shaped bracket, is urged into the groove by the angular pull of the tape 351 of the carriage return spring 350, as best seen in Fig. 3. As the pin drops into the groove, the control bar 270 is rocked in a clockwise direction as seen from the rear. This rocks the head controlling shaft 140 similarly, and thus lowers the play-record head 324 onto the belt 322. At the same time the horizontal arm 274 is moved away from the recording-start contacts 227, which close. Possible bouncing of the play-record head is resisted by the tension of spring 350.

As the control arm 270 is driven slowly forward by the rotation of the lead screw 221, it moves the head shaft 140 and the timing bar 340 and carrier rod 246 along with it. The recording and erasing heads 324 and 322 are thus caused to spiral gradually around the surface of the magnetic belt as it revolves under them, to provide a maximum recording time of one or two minutes, as desired. For one minute operation, it is only necessary to set the drive shaft 125 in the more forward of its two possible positions, where a portion of the shaft of larger diameter just to the rear of its forward end, will engage the drive belt 123. For two minute operation, the drive shaft 125 is locked in its retracted position where its smaller diameter tip will engage the drive belt 123.

The length marking magnet 580, which operates at the start of a recording, releases upon the completion of the recording. Upon the release of the armature 281 of this magnet, a friction pad 282 mounted on its upper side near its tip (Figs. 2 and 3) is pressed up against the rod 246, and holds it and the timing bar 340 in their final position, to mark the terminating point of the message. The heads are then retracted by the operation of trip magnet 560. As the trip magnet operates, its T-shaped armature 260 (Figs. 2 and 4) strikes against the inner side of a small roller 275, suspended from an angle bracket 273 mounted on the outer face of control bar 270 toward its lower end. The control bar 270 is thereby rocked anti-clockwise as seen from the rear, the pin 272 is lifted clear of the lead screw 221, and the spring 350 pulls the bar 270 back against the back plate 250. This causes the heads 322 and 324 to be retracted to their starting position, causes the trip front contacts 341 to open, and causes the reopening of the trip rear contacts 345, which of course had closed when the control bar 270 first started moving forward. As the bar 270 is pulled rearward, the roller 275 will roll across the armature 260, to provide a minimum of frictional resistance. The timing bar 340 remains in its advanced position as long as there is no change in the message, that is, until the next recording. The cam 495 closes the cam springs 228 and 229 once for each revolution of the drum, several revolutions of which may be required to record or repeat any given message.

Figure 5:
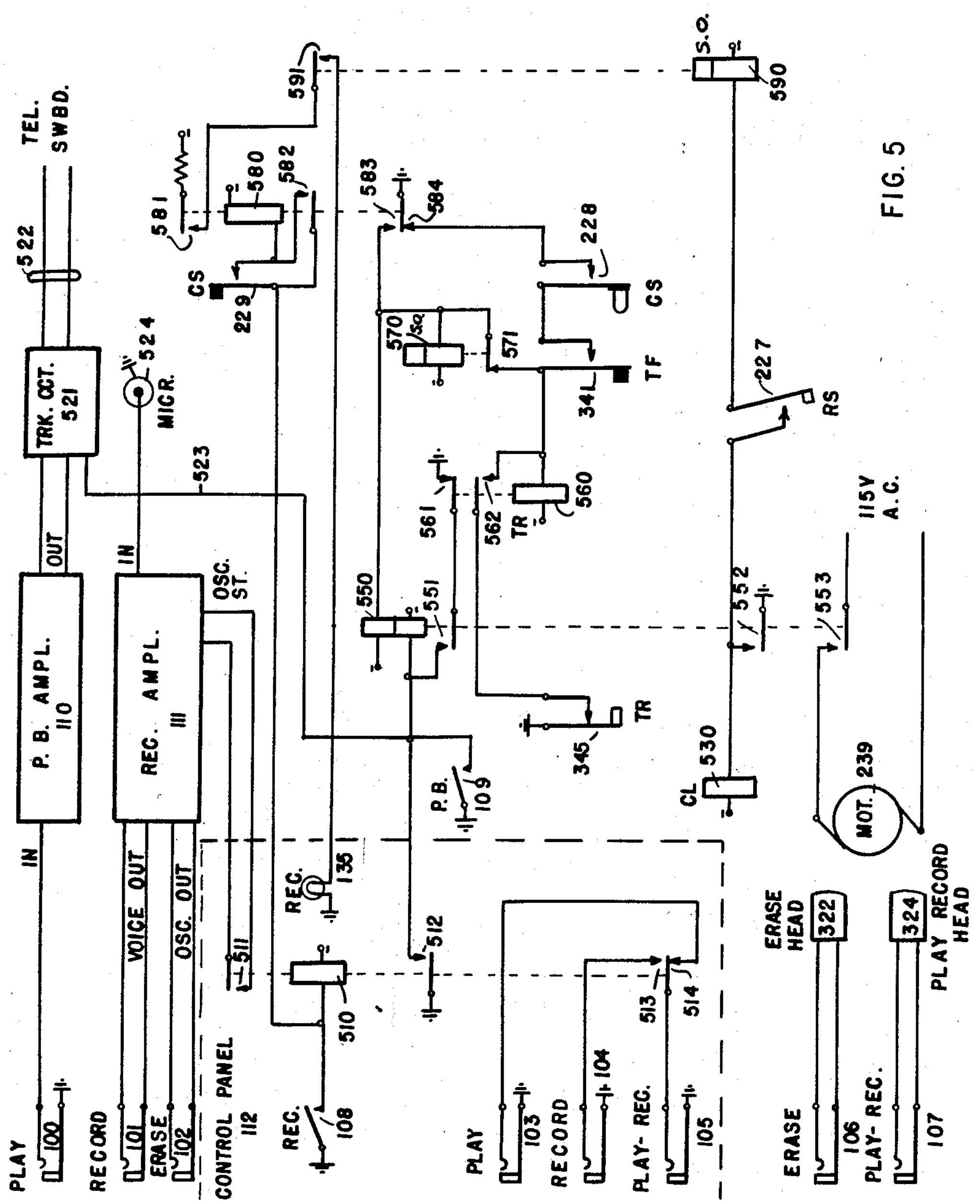
Fig. 5 is a schematic circuit diagram of one form of the invention, wherein all of the controls are incorporated in the unit itself.

The electrical control of the machine when using a local control panel only, as shown in Fig. 5, will now be described, it being assumed that the unit is located at the telephone office, and controlled from there. However it may just as well be located elsewhere, in which case a two-wire trunk must be provided between the output of the playback amplifier 110 and the telephone office. Means must also be provided for extending starting ground to the equipment, when this trunk is seized by a subscriber wishing to hear the recorded message. Where the recorder is located at the telephone exchange, this may be done directly by a relay in the trunk. Otherwise it may be extended over one side of the trunk line, as by a simplex circuit, or otherwise, as preferred. The various relays and electromagnets of the machine are assumed to operate on 48 volts direct current, which may be obtained from the exchange battery or from a rectifier, as conditions permit. The positive side of this battery is assumed to be grounded.

To make a new recording, the machine attendant, after plugging in a portable microphone to the jack 115 shown at the left on the recording amplifier panel 111 in Fig. 1, will operate the record key 108, thereby operating record relay 510. Relay 510 thereupon, at its contacts 511 closes a start circuit to a vacuum tube oscillator associated with the recording amplifier. The oscillator starts, and extends alternating current over the oscillator output leads and erase jacks 102 and 106 and the interconnecting patch cord, to the erase head 322 for the purpose of erasing the previous recording. Relay 510 also, at its contacts 512 closes a circuit to the lower winding of start relay 550, and at its contacts 513 connects the voice output circuit of the recording amplifier to the play-record head 324 by way of the record jacks 101 and 104 and the interconnecting patch cord, contacts 513, and the play-record jacks 105 and 107 and their interconnecting patch cord.

Start relay 550 now operates, and at its contacts 551 prepares, or closes, a locking circuit for itself, depending on the condition of trip magnet 560. Start relay 550 also, at its contacts 552 operates clutch magnet 530, and at its contacts 553 starts the motor 239. The clutch magnet drops the drive wheel 240 and the drive shaft 125 into engagement with the motor shaft and the drive belt, in the manner previously explained, and the magnetic drum begins to revolve.

If, or when, the cam springs 228 and 229 are closed by the drum's cam 495, the length marking magnet 580 operates, in parallel with record relay 510, through cam springs 229. Magnet 580 thereupon pulls down its armature 281 and disengages the friction pad 282 from the timing bar carrier rod 246. The rod 246 and the message timing bar 340 are thereupon pushed back to their starting position by the spring 342. Magnet 580 further, at its contacts 581 prepares a circuit to the record lamp, at contacts 582 locks direct to the record switch, and at contacts 583 closes parallel circuits to the cut off relay 570, the trip magnet 560, and the upper winding of start relay 550. The start relay is not visibly affected, since it is already operated, and the cut off relay 570, being made slow to operate, as by the use of a copper slug on the armature end of the core, operates only after a slight delay. The trip magnet 560 operates at once however, rocks control bar 270 to pull pin 272 clear of the lead screw, and enables the spring 350 to pull the control bar 270, the shaft 140 and the heads 322 and 324 back to their starting position, in the manner previously explained. Relay 570 upon operating, opens the original circuit of the trip magnet, but the latter is now locked through its contacts 562 to the trip rear contacts 345. When the heads are fully retracted, the control bar 570 opens the trip rear contacts, and trip magnet 560 releases. The record springs 227 are opened by the arm 274 when trip magnet 560 rocks the control bar.

The rotation of the drum 120 however, soon causes the pin 272 to drop into the threads of the lead screw 221, and to start the forward movement of the control bar 270. The arm 274 now permits the record springs 227 to close the circuit of the slow to operate lamp control relay 590, from ground at contacts 532. Relay 590 accordingly operates, after a slight delay, and at its contacts 591 closes the circuit of the record lamp 135 which lights as a signal that recording may begin.

The attendant now speaks the new message into the microphone 524. After amplification by the amplifier 111, the message passes through the jacks 101, 104, 105 and 107 to the play-record head 324 which impresses it on the belt 122 in a spiral path which may circle the drum several times. The now energized erase head 322, which traces the same track just ahead of the head 324, erases any previous message which may have been recorded, up to the stopping point of the new message. The trip-front springs 341 are moved forward by the control bar 270 at the same rate as the heads, in the manner already explained.

Upon completion of the recording, the attendant opens the record switch 108, thereby releasing the record relay 510 and the length marking magnet 580. Record relay 510, at its contacts 511 stops the oscillator, at its contacts 512 opens the operate circuit to start relay 550, now locked to the trip magnet 560, and at its contacts 514 re-connects the play-record head 324 to the input of the playback amplifier 110, by way of jacks 107, 105, 103 and 100 and the interconnecting patch cords. Length marking magnet 580 upon releasing, permits its armature 281 to lift friction buffer 282 up against the timing bar carrier rod 246, thus holding the rod 246 and the timing bar 340 in their last position. Magnet 580 also, at its contacts 581 extinguishes the record lamp, at its contacts 583 de-energizes the upper winding of start relay 550 and releases cut off relay 570, and at its contacts 584 prepares a new circuit to trip magnet 560.

Since the trip front contacts 341 are still held closed by the control bar 270, the re-operation of the trip magnet is now dependent on the closure of cam springs 228. Upon the next closure of the cam springs therefore, by the cam 495 on the drum, the trip magnet 560 operates, and again rocks the control bar 270 to pull pin 272 clear of the threads of lead screw 221, thereby opening the record contacts 227 and releasing lamp relay 590. As soon as the pin 272 is clear of the lead screw, the return spring 350 pulls the control bar 270 and the head shaft and heads back to their starting position. The trip magnet locks to the trip rear contacts 345, and unlocks start relay 550. The trip front contacts 341 open when control bar 270 begins its rearward movement, and the trip rear contacts 345 open when it completes this movement, thereby releasing the trip magnet. Start relay 550 releases quickly, upon the operation of the trip magnet, and opens its locking contacts 551. Relay 550 also, at contacts 552 and 553 releases clutch magnet 530, and stops motor 239. The machine is now in standby condition for playback.

Should the attendant mis-judge the message length, or speak too slowly, so that the pin 272 reaches the limit of the threads on the lead screw before the message is completed, a sloping shoulder at the conclusion of the last thread will cause the pin 272 to be alternately lifted out of the thread and dropped back in again, at each rotation of the lead screw. This will cause record springs 227 to open and re-close, as the control bar 270 is rocked back and forth. Lamp relay 590 will accordingly release and reoperate at like intervals, and will cause record lamp 135 to flash, as a warning to the attendant. The attendant will thereupon release and re-operate the record key 108, and repeat the message faster or shorten it.

When the listening trunk 522 is seized by a calling subscriber, the trunk circuit 521 extends starting ground, as previously mentioned, to conductor 523 and the lower winding of start relay 550, in any convenient manner. Start relay 550 accordingly operates, and locks to break contacts 561 of the trip magnet. Relay 550 also, at contacts 552 and 553 operates clutch magnet 530, and starts motor 239, whereupon drum 120, shaft 121 and lead screw 221 begin to rotate. Shortly after the rotation starts, the pin 272 drops into the thread of lead screw 221, and the control bar 270 begins to move the heads forward again across the face of the drum. At the same time contacts 227 close and cause the operation of lamp relay 590, which is without effect however, since relay 580 is not operated at this time. The erase head 322 and the record head 324 now spiral around the magnetic belt in the same path as before and the head 324 repeats the recorded message to the calling subscriber over jacks 107, 105, 103, 100 and the connecting patch cords, and through the playback amplifier 110, the trunk 522, and the telephone switchboard not shown. The movement of the erasing head is of course without effect, since the oscillator circuit is now open.

When the recording head 324 reaches the end of the message, as marked by the position of the trip front contacts 341, the control bar 270 closes these contacts. At the next operation of the cam springs 228 and 229 therefore, a circuit is closed to trip magnet 560 via contacts 584, 228, and 341. Trip magnet 560 accordingly operates, locks to the trip near contacts 345, and opens the locking circuit of start relay 550. At the same time, armature 260 of the trip magnet rocks control bar 270 to pull pin 272 clear of the lead screw, and enables spring 350 to pull bar 270 back to the starting position. When the bar 270 is completely retracted, it opens the trip rear contacts 345, thereby releasing the trip magnet.

If the calling subscriber hangs up, or if the listening trunk is released, while the trip magnet 560 is still energized, start relay 550 will release, and the motor and drum will stop. Otherwise the start relay will remain operated, and the message will be repeated as often as necessary, with immediate return of the recording head each time, at the conclusion of the message, regardless of its length. This eliminates the long period of waiting time that would result, in the case of a short message, between repetitions of the recording, without requiring the substitution of a new drum each time, to fit the length of the recording.

The playback switch 109 is for test purposes only, and would be supplemented by a telephone head set not shown, connected to the output of the playback amplifier.

The general operation of the machine when controlled from a remote point in accordance with the circuit diagram of Figs. 6 and 7, is substantially identical with the operation under local control which has been described. Only the control circuits are different.

In Figs. 6 and 7, a local battery telephone is shown connected to the left side of the transformer 600 located at the remote control point. The other side of transformer 600 is shown connected by a two-wire trunk to the transformer 620 located on the control panel 712, which, with the rest of the recorder, is assumed to be located in the telephone exchange. Also located at the remote point are a record key 608, a playback key 609 and a record lamp 635, which are connected to the sides of the trunk in a simplex arrangement. The transformer 620 is connected to the relays 710 and 720 and to the recording and playback amplifiers as indicated.

To make a new recording, the distant attendant removes the telephone handset, thereby enabling the transmitter 605 and the receiver 606 thereof, and closes the record key 608. A circuit is thereby completed to record relay 710 over the upper trunk wire 601, the upper line windings of the transformers 600 and 620, and conductor 630. Relay 710 operates over this circuit, at its contacts 711 closes the oscillator start circuit, at contacts 712 prepares a circuit to the length marking magnet 580, at make contacts 713 and 714 connects the right side of transformer 620 to the input side of the second stage of amplification of the recording amplifier 111, at contacts 715 prepares the remote record lamp circuit, at contacts 716 operates start relay 550, and at contacts 717 connects the voice output of the recording amplifier 111 to the play-record head, via jacks 101, 104, 105 and 107. The start relay 550 closes circuits to the clutch magnet 530 and motor 239, to start the drum in the manner previously explained.

As soon as cam springs 229 are closed by the drum's cam 495, length marking magnet 580 operates and locks, at contacts 581 prepares the record lamp circuit, and at contacts 583 operates trip magnet 560, and energizes slow relay 570, and the upper winding of start relay 550. Length magnet 580 also releases slide rod 246, which immediately starts its rearward movement under pressure of restoring spring 342. The operation of trip magnet 560 frees the control bar 270 from the lead screw, and bar 270 thereupon also starts its rearward movement, under the pull of spring 350. When control bar 270 and the timing bar carrier rod 246 are both in their rearmost positions, the trip rear contacts 345 are opened and the trip front contacts 341 are closed. Trip magnet 560 releases when contacts 345 open, cut off relay 570 being now in the operated position, all as already explained.

When the pin 272 of the control bar 270 drops into the threads of the lead screw 221, shortly after the start of rotation, the arm 274 permits the re-closing of the recording start contacts 227. Lamp relay 590 then operates, from contacts 552, after the usual short delay. Relay 590 thereupon completes the circuit of the distant record lamp 635, from negative battery through relay contacts 581, 591, and 715, the lower line windings of transformers 620 and 600 and the lower trunk wire 602, and the lower contacts of the record key 608 to ground through the record lamp. Record lamp 135 on control panel 712 also lights in this circuit.

The attendant at the remote station on noting the lighting of the record lamp, now speaks the message into the transmitter 605 of the telephone handset. The resulting currents pass through the two transformers by induction, and thence over the wires 640 and 650 and make contacts 713 and 714 to the recording amplifier 111. The connection in this case is to the second stage of the amplifier, since the voice is already considerably amplified in the telephone. The amplifier 111 in turn causes the recording head 324 to record the message on the magnetic belt in the usual way, while head 322 erases the previous message, and the timing bar 340 is advanced as before.

Upon completion of the message, the distant attendant opens the record key 608 and closes the playback key 609. To avoid possibility of having both keys closed at the same time, a double-throw key is employed, which may be moved from record to playback position by a simple reversal. Key contacts 618 and 628 accordingly open, and cause record relay 710 to release, and record lamp 635 to be extinguished. Key contacts 619 then close, and prepare a circuit to play back relay 720 over the lower trunk wire 602.

Record relay 710 upon releasing, at its contacts 711 stops the oscillator, at contacts 712 releases length marking magnet 580, at contacts 713 and 714 disconnects transformer 620 from the telephone input of the recording amplifier and connects it instead to the output of the playback amplifier, at break contacts 715 causes the operation of playback relay 720 from playback key 609, and at contacts 716 opens the original circuit for start relay 550, now locked to trip magnet 560. Relay 710 further, at contacts 717, 718 disconnects the play-record head 324 from the output of the recording amplifier and connects it to the input of the playback amplifier, over jacks 107, 105, 103 and 100.

The operation of playback relay 720 closes a new circuit to the lower winding of start relay 550, while the release of length magnet 580, which occurs at the same time, locks the length bar 340 and the closed trip front contacts 341 in place, releases cut off relay 570, and, upon the next closure of cam springs 228, operates trip magnet 560 via contacts 584, 228 and 341. Trip magnet 560 thereupon causes lamp relay 590 to release, and control bar 270 and the heads 322 and 324 to return to their starting position in the manner already described. The trip front contacts 341 and the trip rear contacts 345 are thereby opened and cause the release of trip magnet 560.

Since start relay 550 has not released, the drum continues to rotate without interruption, the pin 272 again drops into the threads of the lead screw and again starts the forward movement of control bar 270 and the head shaft 140. As the recording head retraces its original spiral path around the drum, it repeats the recorded message to the distant attendant over the following circuit: play-record head 324, jacks 107, 105, 103, 100, input of playback amplifier 110, output of amplifier 110, break contacts 713 and 714, wires 640 and 650, through transformer 620 by induction, trunk wires 601 and 602, and through transformer 600 by induction to the receiver 606 of the telephone handset.

Upon completion of the playback, control bar 270 will close the trip front springs 341 in the usual manner, and on the next closure of cam springs 228, trip magnet 560 will operate, and will cause the return of bar 270 and the recorder heads to their start position as before. And when the distant attendant opens the playback key 609 by restoring the key handle to the neutral position, playback relay 720 will release and open the original circuit to start relay 550. Relay 550 will then release, either immediately, or at the completion of the next playback, depending on how quickly key 609 is opened.

When a calling subscriber comes in on the listening trunk 522, start relay 550 is operated from the trunk circuit 521 over wire 523 exactly as before, and the message is repeated out over trunk 522 in the same manner as already described.

In case of need, the machine can also be controlled locally. Thus to make a new recording, it is only necessary to operate the record switch 108 and when the local record lamp 135 lights, to speak the message into microphone 524. And to monitor the message, it is only necessary to plug a headset into a listening jack, not shown, on the playback amplifier and to operate playback key 109. The operation is similar to the operation already described.

What is claimed is:

1. A variable message length announcement machine comprising, in combination: a normally stationary magnetic drum and recording head, means for rotating said drum and advancing said head axially thereover to record a message spirally around said drum, electrical message length marking contacts, means for automatically advancing said contacts in unison with said recording head, means for stopping said drum and restoring said recording head alone to its start position following said recording while holding said contacts in their advanced position, means for again initiating the operation of said drum and recording head to reproduce said message, and means controlled by said positioned contacts for again stopping said drum and restoring said recording head alone to its start position in response to the arrival of said head at the end of said message.

2. In a variable message length announcement machine employing a magnetic drum and a magnetic recording head, means for rotating said drum and causing said head to trace a spiral path around said drum and record an announcement thereon, said announcement being of any desired length up to several revolutions of said drum, means for advancing said head across said drum during said recording in response to said rotation, electrical marking contacts, means for also advancing said contacts in response to said rotation to mark the end of said announcement, means for stopping said drum and returning said head to its start position at the conclusion of said recording, means for locking said contacts in their advanced position responsive to the actuation of said stopping means, means for again starting said drum and advancing said head to reproduce said announcement, and electromagnetic means jointly controlled by said advanced marking contacts and said further rotation for returning said head to its start position after any number of possible revolutions of said drum, dependent on the position of said locked marking contacts.

3. A variable message length recorder announcer comprising, in combination: a rotatable magnetic drum, recording and erasing heads, a length marking electrical contact set, means for rotating said drum under said heads to record an announcement thereon while erasing a previous announcement, means responsive to said rotation for advancing said heads and said contact set correspondingly to make a spiral recording and to mark the end of the announcement, means for stopping said rotation at the conclusion of said announcement, means operated responsive to the operation of said stopping means for returning said heads to their start position, other means operated responsive to the operation of said stopping means for holding said contact set in its advanced position, means for actuating said held contact set responsive to said return of said heads, means for again starting said rotation to advance said heads without erasure to reproduce said announcement, means for again actuating said held contact set responsive to said heads again reaching the end of said announcement during each such reproduction, and means operated responsive to each said last actuation for again returning said heads to their start position.

4. A recorder announcer as in claim 3 including a record relay for initiating said recording operation, and means operated responsive to the operation of said record relay for returning both said heads and said contact set to their start positions at the beginning of each said recording operation.

5. A recorder announcer as in claim 3 including spring means urging said contact set to its start position, an electromagnet, means controlled by said electromagnet for locking said contact set in any given position in one position of said electromagnet and for freeing said contact set in the other position of said electromagnet, and means for operating said electromagnet to said other position only during said recording operation, to enable said spring means to restore said contact set to said start position at the start of said recording operation, and to enable the advance of said contact set during said recording operation.

6. A variable message length recorder announcer comprising, in combination: a rotatable magnetic drum, recording and erasing heads, a length marking device, means for rotating said drum under said heads to record an announcement thereon while erasing a previous announcement, means responsive to said rotation for advancing said heads and said marking device correspondingly to make a spiral recording and to mark the end of the announcement, means for stopping said rotation at the conclusion of said announcement, means operated responsive to the operation of said stopping means for returning said heads to their start position, other means operated responsive to the operation of said stopping means for holding said marking device in its advanced position, means for again starting said rotation to advance said heads without erasure to reproduce said announcement, a lead screw rotated by said drum, a head control bar, means responsive to the initiation of said rotation for causing said control bar to operatively engage said lead screw to advance said heads during said recording and reproducing operations, electrical contacts on said held marking device closed by said control bar during said reproducing operation responsive to said heads again reaching the end of said announcement, an electromagnet operated responsive to said closing of said contacts for disengaging said control bar from said lead screw, spring means effective responsive to said disengagement for returning said control bar and said heads to their start position, a driving member on said control bar resting on a high point of the thread of said lead screw when said control bar is in said start position, spring means for moving said driving member into the groove of said thread when said screw begins to rotate, a cam associated with said drum, cam contacts closed by said drum during each revolution of said drum, and means for operating said disengaging electromagnet only while said cam contacts are closed, to cause said driving member to stop on substantially the same high point of the thread upon each return of said control bar to its start position.

7. A variable message length recorder announcer comprising, in combination: a rotatable magnetic drum, recording and erasing heads, a length marking device, means for rotating said drum under said heads to record an announcement thereon while erasing a previous announcement, means responsive to said rotation for advancing said heads and said marking device correspondingly to make a spiral recording and to mark the end of the announcement, means for stopping said rotation at the conclusion of said announcement, means operated responsive to the operation of said stopping means for returning said heads to their start position, other means operated responsive to the operation of said stopping means for holding said marking device in its advanced position, means for again starting said rotation to advance said heads without erasure to reproduce said announcement, a lead screw rotated by said drum, a head control bar, means responsive to the initiation of said rotation for causing said control bar to operatively engage said lead screw to advance said heads during said recording and reproducing operations, electrical contacts on said held marking device closed by said control bar during said reproducing operation responsive to said heads again reaching the end of said announcement, an electromagnet operated responsive to said closing of said contacts for disengaging said control bar from said lead screw, spring means effective responsive to said disengagement for returning said control bar and said heads to their start position, an armature for said control bar disengaging electromagnet, a roller on said control bar engaged by said armature when operated to disengage said bar from said lead screw, and said roller arranged to roll on said operated armature during the return of said control bar to its start position.

8. In an announcement system, a rotatable magnetic drum, means for starting rotation of said drum, a lead screw rotated responsive to said rotation of said drum, a control bar having a normal position in which an extension thereof rests on a high point of one of the threads at the tip end of said lead screw, means for causing said extension to drop into the threads of said lead screw responsive to the starting of said rotation, said control bar advanced along said rotating lead screw responsive to said dropping, a recording head advanced axially over said rotating drum responsive to the advance of said control bar, means for causing said advancing recording head to record a message spirally around said rotating drum, electrical contacts, means for closing said contacts responsive to said dropping of said control bar extension into said threads, a record lamp lighted in response to said closure, and means for moving said extension in and out of the last thread should the message be too long thereby to flash said record lamp as an indication thereof.

9. In an announcement system employing a magnetic recorder, a magnetic drum, a recording head, a record relay, a playback relay, a lead screw, a control means, means responsive to the operation of said record relay for rotating said drum and said lead screw, automatic means for moving said control means into operative engagement with said rotating lead screw, said control means then moved along said lead screw responsive to said engagement, means responsive to said last movement for moving said recording head across said drum to record a variable length message spirally thereon, a pair of electrical marking contacts moved by said control means to mark the end of said message, means responsive to the release of said record relay to stop said drum and return said control means and said recording head to their start position, means also responsive to the release of said record relay for holding said marking contacts in their advanced position, means responsive to the operation of said playback relay for again starting said drum and lead screw and engaging said control means and lead screw to cause said recording head to reproduce said message, means for actuating said held contacts by said control means responsive to said head again reaching the end of said message, and means for immediately returning said control means and said head to their start position in response to said actuation.

10. In an announcement system of the character described, a recorder, a record relay and a playback relay at the recorder location for initiating the recording and playback operations, a two-wire trunk employing a ground return, recording and playback switches and a record lamp at a remote point connected to the recorder by said two-wire trunk, means responsive to the operation of said recording switch for operating said record relay over said trunk, means responsive to the operation of said record relay for controlling the lighting of said record lamp from the recorder over said trunk, means responsive to the operation of said playback switch for operating said playback relay over said trunk, means for recording a message on said recorder from said remote point over said trunk, and means for transmitting a reproduction thereof from said recorder to said remote point over said trunk.

11. In an anouncement system of the character described, a recorder, a record relay and a playback relay at the recorder location for initiating the recording and playback operations of the recorder, a two-wire trunk having ground return connections, a record switch, a play back switch and a record lamp at a remote point, said switches and said lamp connected to said recorder by said two-wire trunk, means responsive to operation of said record switch for controlling said record relay over one wire of said trunk, means for lighting and means for at times flashing said record lamp from said recorder over one wire of said trunk responsive to the operation of said record relay, means responsive to operation of said play back switch for controlling said play back relay over one wire of said trunk, means for recording an announcement on said recorder from said remote point over both wires of said trunk, and means for receiving a reproduction of said announcement at said remote point from said recorder over both wires of said trunk.

References Cited in the file of this patent

UNITED STATES PATENTS

| | | |
|---|---|---|
| 2,530,029 | Pond | Nov. 14, 1950 |
| 2,589,035 | Begun et al. | Mar. 11, 1952 |
| 2,611,037 | De Napoli | Sept. 16, 1952 |
| 2,673,242 | Van Deventer | Mar. 23, 1954 |